Sept. 29, 1936. E. D. RAPISARDA 2,055,805
COLD BOX
Filed Sept. 27, 1934 4 Sheets-Sheet 1
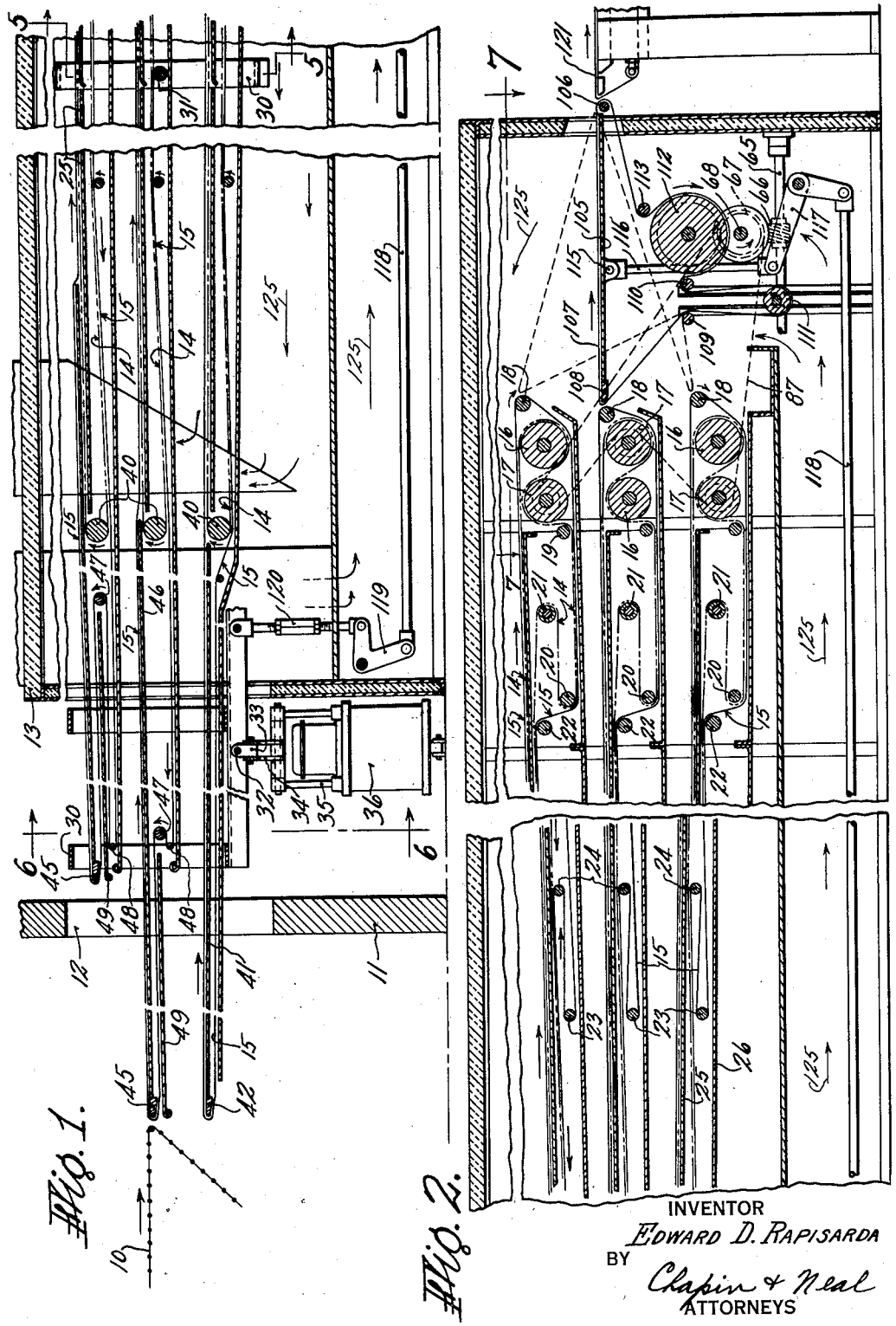
INVENTOR
*Edward D. Rapisarda*
BY
*Chapin & Neal*
ATTORNEYS Sept. 29, 1936.    E. D. RAPISARDA    2,055,805
COLD BOX
Filed Sept. 27, 1934    4 Sheets-Sheet 2
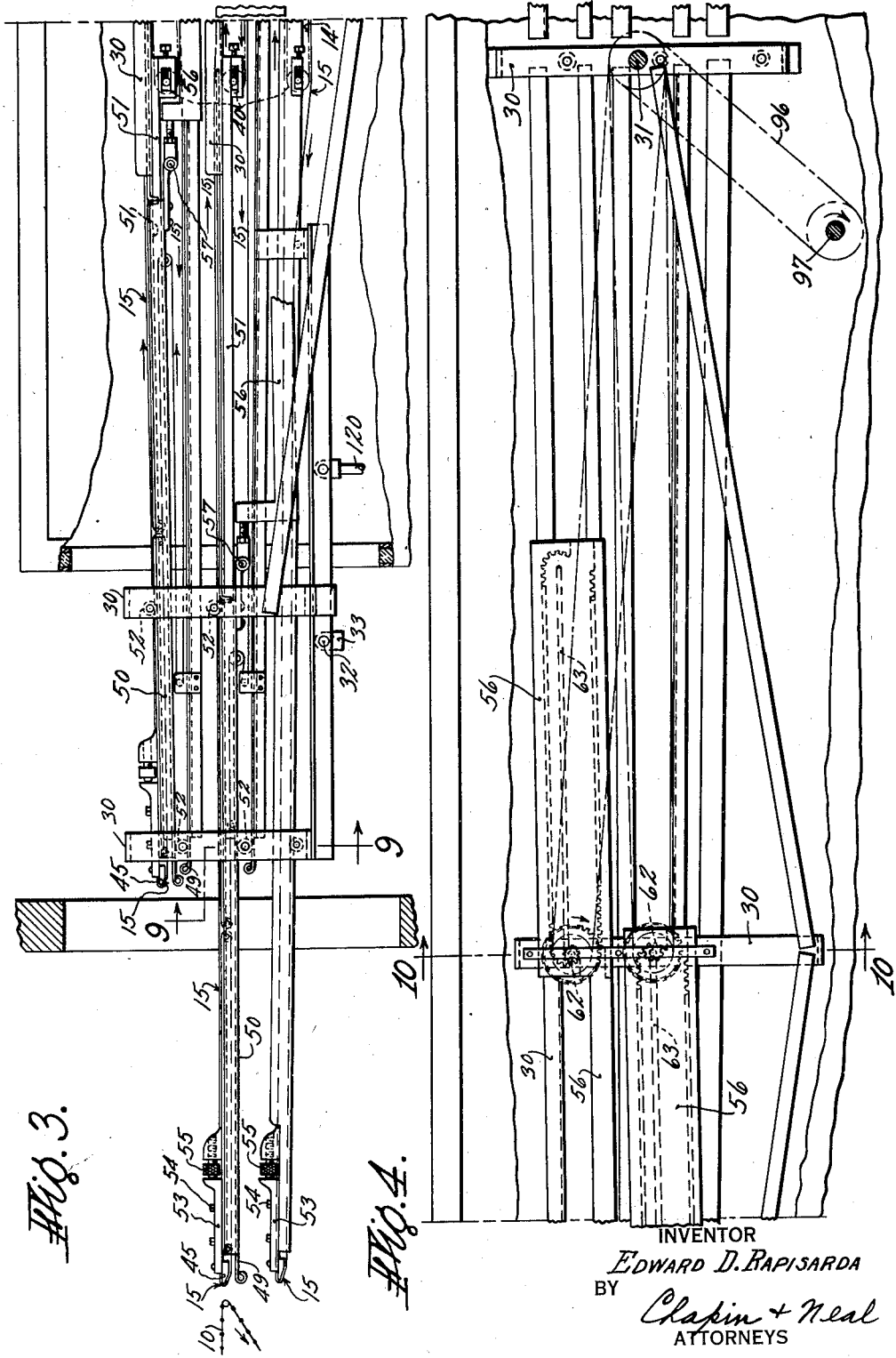
INVENTOR
EDWARD D. RAPISARDA
BY
Chapin + Neal
ATTORNEYS

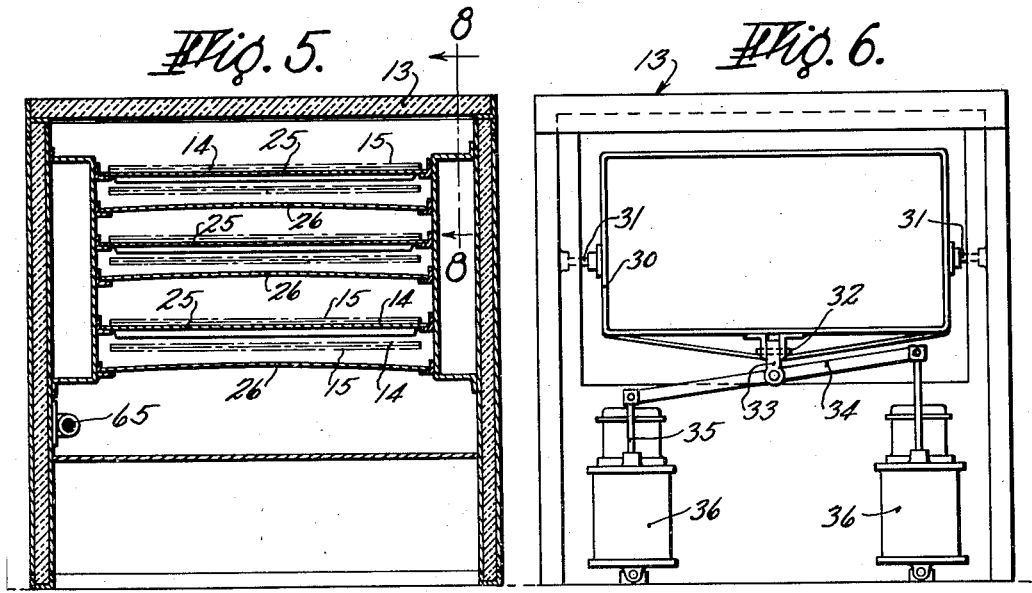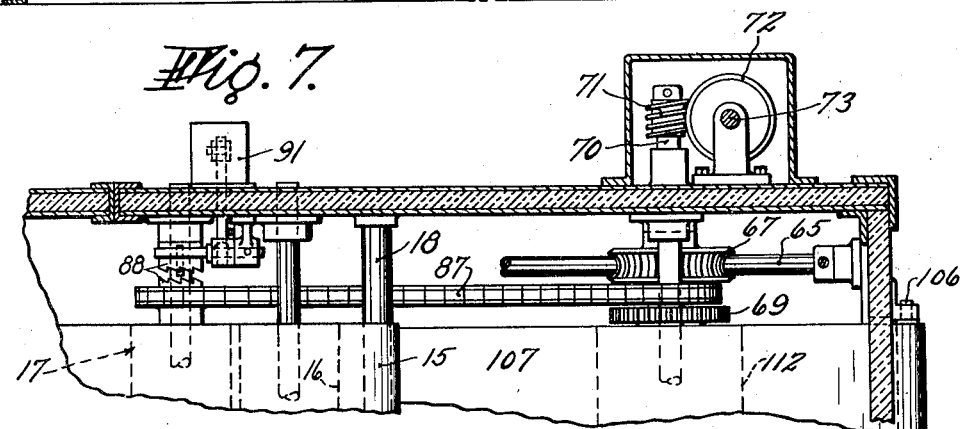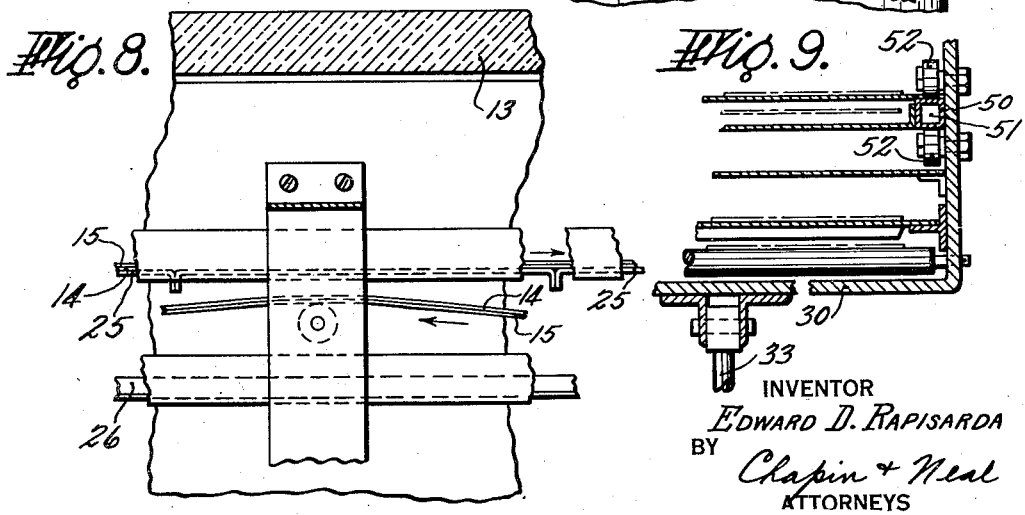

Sept. 29, 1936.  E. D. RAPISARDA  2,055,805
COLD BOX
Filed Sept. 27, 1934    4 Sheets-Sheet 4
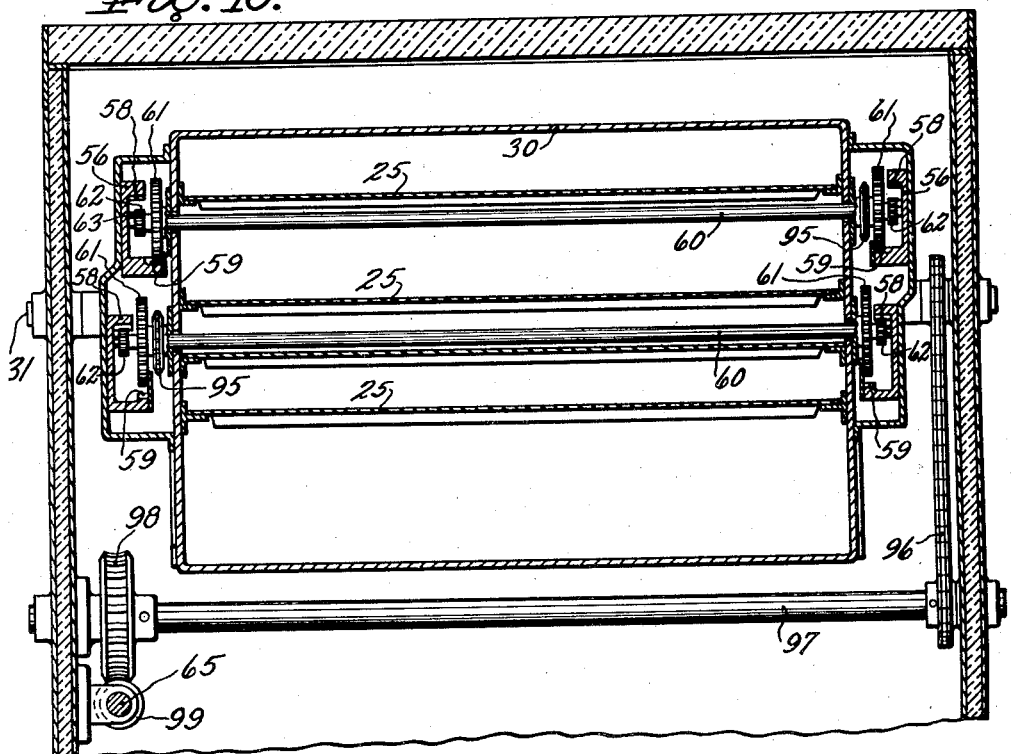
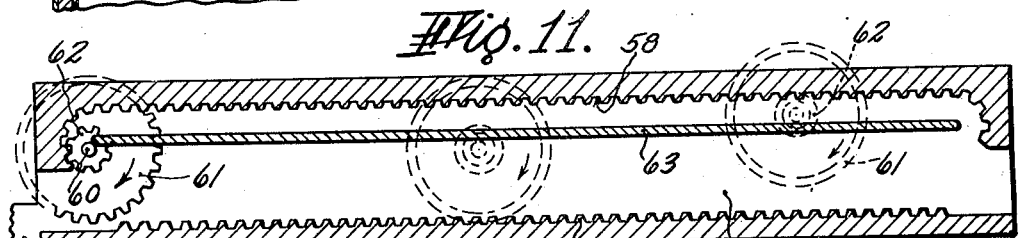
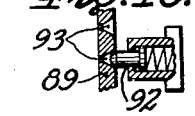
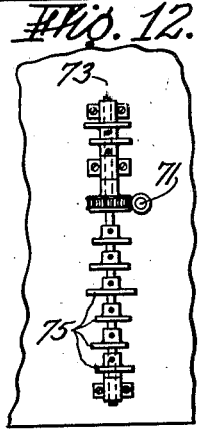
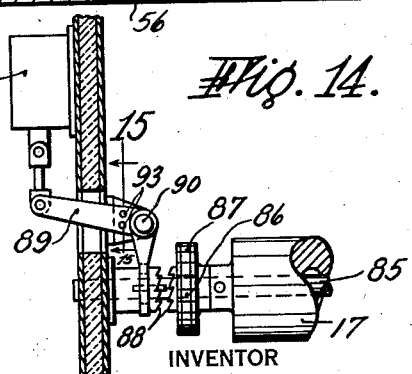
INVENTOR
EDWARD D. RAPISARDA
BY Chapin & Neal
ATTORNEYS Patented Sept. 29, 1936

2,055,805

UNITED STATES PATENT OFFICE 2,055,805

COLD BOX

Edward D. Rapisarda, Agawam, Mass., assignor to National Equipment Company, Springfield, Mass., a corporation of Massachusetts Application September 27, 1934, Serial No. 745,674

6 Claims. (Cl. 198—84)

This invention relates to what is known in confectionery manufacture as a cold box. As one instance of its use, reference will be made to the coating of candy centers with chocolate on what is known as an enrober. In this type of machine the candy centers are passed through molten chocolate and are transferred to a support, generally of paper, on which they are retained until the chocolate coating has cooled and become hard. Under some systems the support is in the form of a tray or plaque, a series of plaques being stacked for storage until the candies have hardened. With other systems the support takes the form of an endless conveyor which passes through a cold room or box, and has a sufficient length in proportion to its speed so that the candies will cool by the time they reach the end of the conveyor run. With modern high speed equipment the length of such a conveyor is often too great to permit its use in an ordinary factory. It is the main object of this invention to provide a conveying mechanism which will take care of the output of a modern chocolate coating machine without necessitating too great an overall length. A further object is to provide an efficient mechanism by means of which the coated confections may be received selectively upon one of a series of superposed conveyors until the selected conveyor has been filled, subsequent candies being received upon another conveyer of the series; those conveyors not being filled remaining stationary so as to give a maximum cooling time. A further object is to provide means whereby the receiving ends of the superposed conveyors may be retracted so as to expose the candies on a lower conveyor for some operation such as hand stringing. A further object is to provide a mechanism by which these various mechanisms can be coordinated automatically. A further object is to provide a mechanism by which the confections from the several superposed conveyors may be transferred automatically to a single delivery belt. Additional objects will appear from the following description and claims.

Referring to the drawings:

Fig. 1 is a longitudinal section through the candy receiving end of a cold box constructed in accordance with my invention;

Fig. 2 is a longitudinal section through the delivery end of the cold box, forming in effect a continuation of Fig. 1;

Fig. 3 is a side elevation of the receiving end of the cold box, on a larger scale than in Fig. 1;

Fig. 4 is a continuation of Fig. 3, covering an intermediate portion of the cold box, Figs. 3 and 4 together covering substantially the same longitudinal extent as Fig. 1;

Fig. 5 is a section on line 5—5 of Fig. 1;

Fig. 6 is a section on line 6—6 of Fig. 1;

Fig. 7 is a detail section on line 7—7 of Fig. 2;

Fig. 8 is a detail section on line 8—8 of Fig. 5;

Fig. 9 is a detail section on line 9—9 of Fig. 3;

Fig. 10 is a section on line 10—10 of Fig. 4;

Fig. 11 is a detail of certain gearing;

Fig. 12 is a detail of a control shaft;

Fig. 13 is a detail of one of the contactors operated from the shaft shown in Fig. 12;

Fig. 14 is a detail of the manner in which certain of the parts are arranged for operation; and Fig. 15 is an enlarged section on line 15—15 of Fig. 14.

The wire belt of the enrober or other machine from which the present invention is adapted to receive candies is indicated at 10. Spaced beyond the end of this belt, preferably at a sufficient distance to permit the performance of any usual operation like hand stringing, is a partition 11 separating the enrober room from the cold room and having a window 12 in it to permit the passage of the conveyors. The cold box proper is indicated at 13 and is located beyond the partition.

Within this cold box a plurality of superposed conveyors (three in number as shown) are mounted, each comprising a supporting belt 14 of canvas or the like and a surfaced belt 15 of paper or other smooth material. The drive of the conveyor is accomplished through the canvas belt, which at one end passes around a pair of pulleys 16, 17 and guide rolls 18 and 19. Power is supplied to the canvas belt through pulleys as will be described below. At a point intermediate its ends the canvas belt passes over guide rolls 20 and 21, the latter of which may be adjusted to keep the belt taut. The paper belt passes directly from the roll 20 to a roll 22, so as not to be affected by the adjustment described; and has its own separate tightening arrangement comprising rolls 23 and 24. The upper run of the belts passes over supporting plates 25, while plates 26 underneath the lower run prevent any dirt or broken chocolate from falling from one belt to another.

The ends of the conveyors adjacent the enrober are carried on a separate frame 30 supported within the cold box upon a fulcrum 31. By this method of mounting, the ends of the conveyors adjacent the coating machine may be raised and lowered without the necessity of lifting the entire weight of the long conveyor. The frame 30 may be counterbalanced if desired. It will be realized that the conveyor has been broken away in Figs. 1 and 2 so that the entire cold box can be shown on a single sheet. The length of the box between its two end portions, which have been shown completely as they contain all the operating mechanism, is preferably much greater than would be indicated in the drawings. Upon the pivoted frame 30 is secured a bracket to which a link 33 is hinged. This link serves as the connecting point for a cross piece 34 coupled at its ends to the operating rods 35 of a pair of power lifting devices 36. Preferably these devices are of the commercial type in which the operating rod is moved under the influence of oil circulated by a motor driven impeller. This type of device has a rapid and easy action, and returns to its inactive position as soon as its individual motor is stopped. If desired, pneumatic or hydraulic cylinders of the usual type could be used, but the self-contained characteristics of the type described, together with the fact that it is controllable by its motor circuit with no valves or piping, render that form generally preferable. By using two of these devices as described, the frame 30 can be elevated in two equal steps by causing one or both of the lifting devices to be actuated, thus bringing the middle or lower conveyor into registry with the coating belt 10.

The convass belt of each of the superposed conveyors passes around an idle roll 40. In the case of the lowermost of the conveyors the paper belt 15 continues over a supporting plate 41 terminating in a nose 42 around which the paper passes. Provided that no decorating or other treatment is to be given to the candies after they leave the belt 10 this same construction may be used for the other conveyors. It is preferred, however, to provide the upper two conveyors with retracting mechanism so that they may be drawn back independently when candies are passing onto a belt below. The effect is shown in Fig. 1, in which the middle conveyor is in position to receive candies, and in which the upper conveyor is retracted to expose a sufficient surface of the middle conveyor to permit the performance of some manual operation such as hand stringing. In each of the retractable conveyors, the paper belt, after passing around a nose piece 45 secured to a supporting plate 46, passes around a roll 47 movable with the plate 46 and then around a roll 48 secured to the frame 30. It will be seen from a comparison of the positions of the two upper conveyors in Fig. 1 that no tendency to slackness in the paper belt is caused by the retraction of the nose of the conveyor, since the movement of roll 47 is just sufficient to take up the amount of belt freed by the movement of the nose. A lower drip plate 49 is movable with the plate 46 in the retraction and advance of the latter.

Any suitable method may be employed for supporting and moving the ends of the two upper conveyors. In the preferred embodiment, the conveyor ends are carried upon side members 50 having a tubular cross section as shown in Fig. 9. These members slide upon square rods 51 secured to the vertically movable frame 30. Rolls 52 engage the tubular members 50 at the top and bottom, to assist the rods in steadying them. At the forward end of each pair of members 50 the nose piece 45 is mounted by brackets 53 held in place by clamp screws 54 and an adjusting screw 55.

The nose piece 42 of the lowermost conveyor is similarly mounted.

At its rear end each of the side members 50 is secured to plates 56 by a hinge connection 57 (Fig. 3). Each plate 56 has an upper rack 58 and a lower rack 59, the former having curved ends as shown in Fig. 11. A pair of shafts 60 are journaled in the frame 30, one for each of the two upper conveyors, and each shaft carries at its ends a pair of gears 61 and 62, of which the former is in alignment with the lower rack and the latter is in alignment with the upper rack. The shafts 60 are intermittently operated as will be described below, causing a slow retraction of the end of the conveyor (at a rate substantially the same as the linear speed of the conveyor) when the small gears 62 are in engagement with the upper rack and a faster projection of the conveyor when the large gears 61 are in engagement with the lower rack. The rack-carrying plates 56 pivot slightly to permit the upper and lower racks to come alternately into engagement with their respective racks, a ledge 63 on each plate engaging either above or below the end of the shaft 60 so as to keep the gears in mesh with the proper rack. The action is shown diagrammatically in Fig. 11, where for considerations of space the shaft 60 is shown in different positions along the rack. It is of course the racks and not the shaft which actually move.

As soon as one conveyor level has been filled with confections the retractible conveyor end moves rearwardly at the speed of travel of the paper belt, so that the nose piece 45 maintains a constant position relative to the last confections. During this motion the belt supporting plate 46 on the retractible end slides over the stationary supporting plate 25 and canvas belt 14, as is shown at the top in Fig. 1. When the retractible end has completed its motion of withdrawal it is brought to rest in any suitable manner, the conveyor being also stopped. As the machine is quite long and therefore the mechanical operation of clutches would be rather cumbersome, it is preferred to operate the clutches electrically. This necessitates but a single power shaft 65 running lengthwise of the machine, the control mechanism being connected by simple wiring. The power shaft is driven at a constant speed by any suitable motor or from the coating machine, and at one end is provided with a worm 66 meshing with a worm gear 67 on a cross shaft 68 (Figs. 2 and 7). The latter shaft is connected by gearing 69 with a shaft 70 having at one end a worm 71. A worm gear 72 on a vertical control shaft 73 meshes with this worm, so that the control shaft is driven continuously at a relatively slow rate, completing one revolution in the time necessary for all of the conveyor belts' levels to be filled with confections and be reset to starting position.

Upon the control shaft are mounted a plurality of control cams 75, one of which is illustrated in Fig. 13. Cooperating with each cam is a lever 76, pivoted to the machine frame at 77 and carrying a cam roll 78 and an electrical contact 79. When the contour of the cam is such as to move the lever outwardly or inwardly an electrical circuit is completed between the contact 79 and one or the other of two stationary contacts 80 and 81. In the case of the lifting devices 36 the completion of the control circuits causes actuation of the motor drive; in the case of the other operating parts the control circuit causes actuation of a solenoid clutch connecting the particular mechanism with the power shaft 65. One of these clutches is illustrated in Fig. 14, and may be considered as typical, the clutches having been omitted from the assembly drawings to avoid too great complexity.

In the example shown in Fig. 14, which illustrates the drive for one of the driven rolls 17, the roll is fixed upon a supporting shaft 85 bearing a loose sprocket 86. This sprocket is driven by a chain 87, which as shown in Fig. 2 passes about the sprockets for all three driven rolls 17 and also about a sprocket upon the cross shaft 68. Splined to the shaft is one member of a clutch 88, the other member of which is fixed to the sprocket 86. A bell crank 89 is pivoted to the frame at 90 and is coupled to the movable clutch member to shift it into engagement with the other member of the clutch as the bell crank is rocked. Also connected to the bell crank is a solenoid operating device 91 which is in circuit with the proper contacts 79, 80, 81. Upon completion of the control circuit the bell crank is moved in the proper direction by the action of the solenoid, which is preferably of the double acting type. In order to hold the bell crank in the position to which it is moved, and thus to avoid the necessity of maintaining the current, a spring detent 92 is provided as shown in Fig. 15, having a rounded or tapered end adapted to fit into holes 93 in the bell crank arm.

The three conveyor levels are driven by similar clutch mechanism, and as mentioned above the elevating devices 36 are controlled directly by sets of contacts 79, 80. The retraction and extension of the receiving ends of the conveyors is controlled by solenoid clutches (not shown) on the cross shaft 31 which serves as the fulcrum for the tilting frame 30. This shaft drives the two shafts 60 through the solenoid clutches and chain and sprocket connections 95 (Fig. 10 and is itself driven from the shaft 65 by a chain and sprocket connection 96 to a cross shaft 97 coupled by a worm drive 98, 99 to the shaft 65. This accounts for all but one of the control cams shown in Fig. 12, the remaining one being used to control the spacing of the candy on the belt 10. A device for this purpose is shown in the patent to A. L. Bausman No. 1,680,842, and will not be described in detail here. It is employed to give a gap in the otherwise continuous line of confections and is timed so that the gap reaches the receiving ends of the superposed conveyors at the time when these conveyors are being shifted from one level to another. Any danger of candies dropping between the conveyors as they are being shifted is thus avoided.

At the delivery end of the conveyors is mounted a support 105, pivoted at 106 at its outer end, over which runs a delivery belt 107. Besides running over the pivot 106 and a nose 108 on the support, the belt passes over guide rolls 109 and 110, and between them a floating tension roller 111; and also around a drive pulley 112 and a guide roll 113. The drive pulley 112 is fixed to the shaft 70 previously referred to and therefore turns continuously throughout the operation of the machine. Pivoted at 115 to the support is a link 116 carried by the end of a bell crank 117. A long link 118 couples this bell crank to an oppositely disposed bell crank 119 at the opposite end of the machine, the latter bell crank being joined by a link 120 to the oscillating frame 30. The linkage is so arranged that as the oscillating frame is swung to bring one or another of the superposed conveyors into registration with the feeding-in belt 10 the delivery belt 107 is brought simultaneously into registration with the same conveyor level. It will be noted that the terminal rolls 18 around which the conveyors 15 pass are arranged in an arc taken with the pivot 106 as a center so that the conveyor belt 107 comes equally close to the belts of all three conveyor levels. The fixed end of the delivery belt registers with a conveyor 121 which carries the cooled confections to any desired point.

In operation the candies are received upon one conveyor level and continue to pass onto it until it has been filled. By this time the proper cam on shaft 73 closes its contactor and the lifting devices 36 are actuated to shift the frame 30 and bring another conveyor level into registry. As distinct from the other cams, those controlling the two lifting units are designed to keep their circuit closed during a considerable portion of the machine cycle, assuming that lifting units of the preferred type are used. At the start both units are deenergized, and the highest conveyor level is in registry. After one-third of the cycle one unit is energized, bringing the middle conveyor level into register; and after two-thirds of the cycle the second unit is energized as well, bringing the lower conveyor level into register. At the end of the cycle both units are deenergized, restoring the original condition.

When a conveyor level is filled it is shifted out of register and its motion is continued until retraction is complete and the candies are in the cold room. The conveyor is then stopped. At the same time its retractible end is withdrawn and the delivery conveyor 107 is shifted into registry with the conveyor level just coming opposite the belt 10. The cycle of operation is then repeated for the two other conveyors, this giving time enough so that when the first conveyor is started up the chilled candies on it are in condition to be carried away by the conveyor 107. It will be understood that in continued operation of the machine chilled candies are being fed off from a conveyor level at the same time that fresh candies are being fed onto it, the motion of the conveyor being stopped at such a time that all the chilled candies are removed and the belt is left filled wtih fresh ones which are all located within the cold room. Any desired means for circulating cold air through the cold box in the general direction of the arrows 125 may be employed, this mechanism being capable of use in standard form and therefore not being necessary to illustrate.

What I claim is:

1. A device for handling confections for cooling comprising a plurality of superposed conveyors, each conveyor having a section at one end pivoted, means for moving the pivoted sections as a unit to bring a selected section into registration with a candy feeding station, and means for driving the conveyors independently of each other.

2. A device for handling confections for cooling comprising a plurality of superposed conveyors, a frame pivoted at an intermediate point of the conveyors, means on the frame for supporting one end of each of the conveyors, mechanism for swinging the pivoted frame to cause the conveyors to be shifted as a unit to bring a selected one into registration with a candy feeding station, and means for driving the conveyors selectively.

3. A device for handling confections for cooling comprising a plurality of superposed conveyors, certain of the conveyors having an extensible section at one end, means for projecting or retracting said extensible sections, and mechanism operable to shift the end portions only of the conveyors vertically into selective registration with a candy feeding station.

4. A device for handling confections for cooling comprising three superposed conveyors, a frame pivoted at a point intermediate the ends of the conveyors, means on the frame for supporting one end of each of the conveyors, a pair of elevating devices, a cross piece coupling said devices, and a connection between the middle of said cross piece and the frame.

5. A device for handling confections for cooling comprising an article supporting belt, a plurality of superposed conveyors, means for moving the ends only of the conveyors selectively into registration with the belt, means for receiving the cooled articles selectively from the other ends of the conveyors, and operating means for the conveyors and receiving means timed to cause the conveyors to be brought in succession into registration with the belt, then to cause the conveyor so in registration to be driven until it is substantially filled with coated confections, and then to stop said conveyor and to bring a previously filled conveyor into registration with the article supporting belt.

6. A device for handling confections for cooling comprising a plurality of superposed conveyors having a substantial portion of their lengths in fixed relation, a frame pivoted at a point between the ends of the conveyors and bearing one end portion of each of the conveyors, means for supplying articles to the conveyors at a constant elevation, an article delivery conveyor pivoted at one end, and means for moving said frame and the second end of the article delivery conveyor simultaneously to bring a selected conveyor into registration with the article supplying means and the delivery conveyor into registration with the selected conveyor.

EDWARD D. RAPISARDA.